United States Patent Office 3,231,950
Patented Feb. 1, 1966

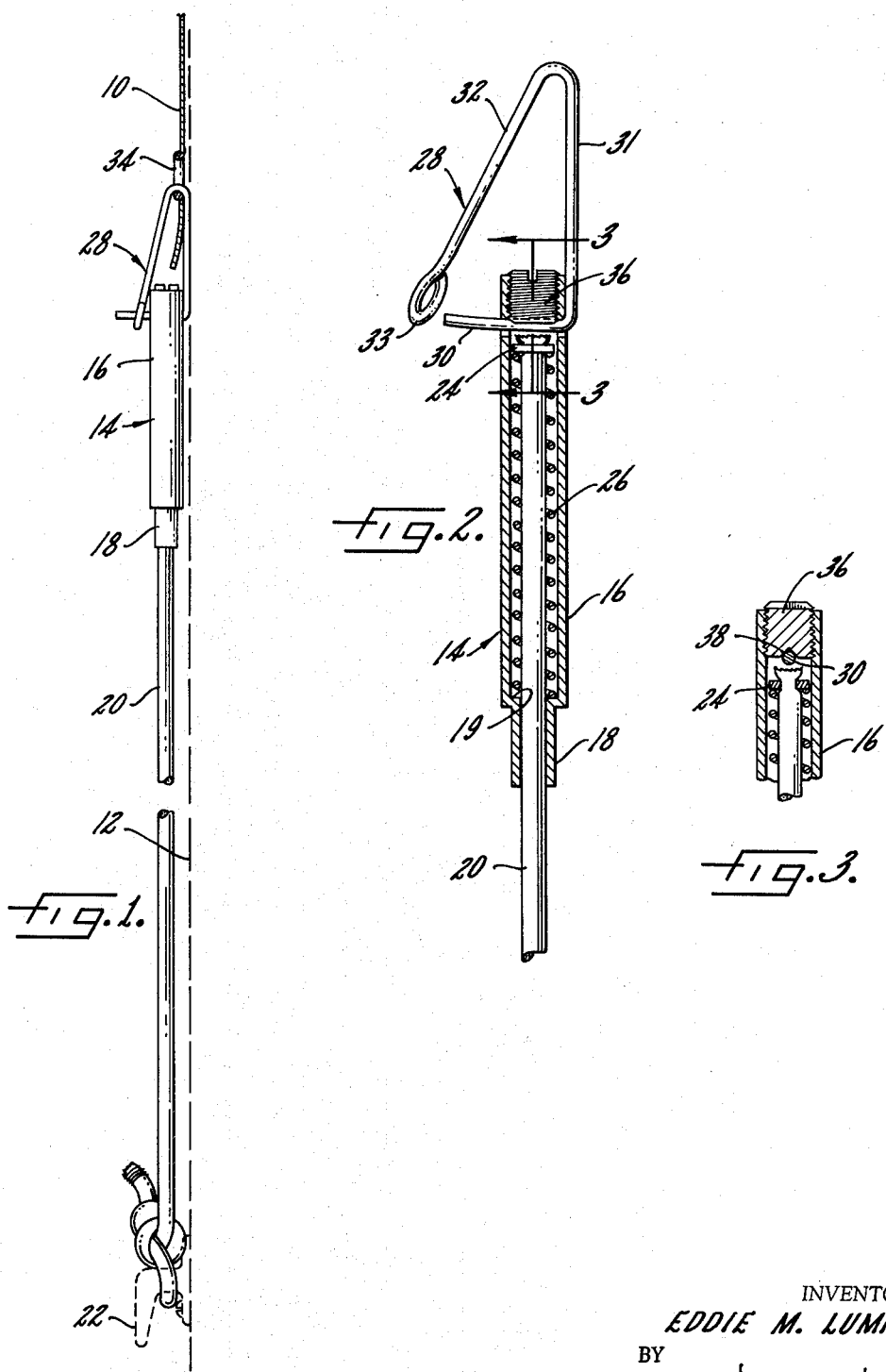

3,231,950
FASTENING DEVICE
Eddie M. Lummis, 419 E. Staat, Fortville, Ind.
Filed Dec. 26, 1963, Ser. No. 333,522
1 Claim. (Cl. 24—73)

This invention relates to a fastening device, and more particularly to a fastener for releasably connecting a tarpaulin or the like to a vehicle or other object.

It is an object of my invention to provide a fastener for a tarpaulin or the like which can be quickly connected to a tarpaulin and the object to which it is to be interconnected, which will provide a tensioned interconnection between said tarpaulin and object, and which can be economically manufactured from inexpensive materials, yet which will prove sturdy and durable in use.

In accordance with one form of the invention, there is provided a generally cylindrical casing having a reduced diameter section at one of its ends. Desirably, an end cap closes the end of said casing remote from said reduced diameter section. A hook is mounted on said casing adjacent its end remote from said reduced diameter section and is adapted to be releasably connected to at tarpaulin or the like.

One end of a rope is carried within the casing and projects outwardly from said reduced diameter section for connection to the object to which the tarpaulin is to be interconnected. A collar is mounted on the end of the rope carried within said casing, and a spring is disposed around said rope with its ends engaging said collar and the reduced diameter section of the casing to yieldably limit movement of said rope outwardly through said reduced diameter section. In this manner, the fastener forms a tensioned interconnection between said tarpaulin and the object to which it is connected.

Other objects and features of the invention will become apparent from the more detailed description which follows and from the accompanying drawing, in which:

FIG. 1 is a side elevation of a fastener embodying the invention and showing said fastener interconnecting a tarpaulin to the side of a vehicle;

FIG. 2 is a longitudinal axial section through the fastener shown in FIG. 1; and FIG. 3 is a fragmentary transverse section taken on the line 3—3 of FIG. 2.

For purposes of illustration, my fastener has been shown in the drawing for interconnecting a tarpaulin 10 to the side of a vehicle 12. Said fastener comprises a generally cylindrically shaped casing 14 having a first section 16 integral with a reduced diameter second section 18. As shown in FIG. 2, the juncture of the sections 16 and 18 forms an internal shoulder 19 within the casing.

A rope 20 is carried within the casing 14 with one of its ends projecting outwardly through the casing section 18 for reception around a cleat 22 mounted on the vehicle 12. Desirably, the internal diameter of the casing section 18 is only slightly larger than the diameter of the rope 20 so that said section will guide the movements of the rope 20 with respect to the casing. A collar 24 is fixedly mounted on the end of the rope carried within the casing section 16 and prevents said rope from being pulled out of the casing through the section 18. A coil spring 26 is disposed around the rope 20 with its ends engaging the collar 24 and shoulder 19 for yieldably limiting movement of the rope outwardly through the casing section 18. Desirably, the inner diameter of the section 16 is slightly larger than the diameters of the collars 24 and spring 26 for thus guiding the movements of the rope within the casing.

In order to connect the fastener to the tarpaulin 10, a hook 28 conveniently formed from a length of wire is mounted on the casing section 16. Said hook comprises a first stretch 30 projecting through aligned openings formed in the section 16. The stretch 30 is integral with a stretch 31 projecting upwardly from the casing in general parallelism with the outer casing wall. The end of the stretch 31 remote form the stretch 30 joins a downwardly angled stretch 32 terminating in a loop 33 receivable over the adjacent end of the stretch 30. In this manner, the stretch 32 can be inserted through a grommet 34 in the tarpaulin 10 and then be bent inwardly to cause its loop 33 to be received over the stretch 30 with the grommet 34 thus being cradled in the juncture of the stretches 31 and 32. The stretch 31, being parallel to the outer wall of the casing 14, will cause the fastener to lie immediately adjacent the wall of the vehicle 12. With the hook 28 connected to the tarpaulin 10 and the rope 20 connected to the cleat 22, the spring 26 will thus cause the fastener to provide a tensioned interconnection between said tarpaulin and cleat.

As shown in FIG. 3, the end of the section 16 adjacent the hook 28 is closed by an end cap 36 threadably received in the casing and preventing moisture from entering said casing and freezing therein to prevent movement of the spring 26 and rope 20 relative to said casing. The inner face of the end cap 26 has a transverse extending groove 38 receivable over the adjacent face of the hook stretch 30 to thus provide an extended bearing support for said hook. As shown in FIG. 3, the end cap 36 and hook stretch 30 further prevent the rope from being forced out the casing end remote from the section 18.

While my fastening device has been described as being used for interconnecting a tarpaulin to a vehicle, it is to be understood, of course, that said device can be employed for interconnecting any desired pair of objects.

I claim:

A fastener for tarpaulins or the like, comprising a casing having a first cylindrical section connected at one of its ends to a second cylindrical section of small diameter than said first section, the juncture of said first and second sections forming a shoulder within said casing, a rope carried within said first section and projecting outwardly through said second section, a collar on said rope projecting outwardly therefrom within said first section, a spring in said first section disposed around said rope and engageable with said collar and shoulder for yieldably limiting movement of said rope outwardly through said second section, a hook having a first stretch extending through a pair of openings in said first casing section, a second stretch integral with said first stretch and generally parallel with the outer wall of said casing, and a third stretch integral with said second stretch and releasably connected to said first stretch for connecting said hook to a tarpaulin or the like, and an end cap mounted in the end of said first casing section remote from said second casing section, said end cap having a groove formed therein in which the first stretch of said hook is seated.

References Cited by the Examiner

UNITED STATES PATENTS

| | | | |
|---|---|---|---|
| 371,749 | 10/1887 | Fitzpatrick et al. | |
| 1,231,742 | 7/1917 | Hurlbut | 24—237 |
| 1,528,712 | 3/1925 | Ward | 24—1 |
| 1,858,550 | 5/1932 | Kahle | 24—237 |
| 2,173,750 | 9/1939 | Braconi | 24—237 |
| 2,420,276 | 5/1947 | Wood | 267—71 |
| 2,856,077 | 10/1958 | Stanton | 267—71 |
| 2,907,134 | 10/1959 | Trautvetter. | |

WILLIAM FELDMAN, Primary Examiner.

BOBBY R. GAY, DONLEY J. STOCKING,
Examiners.